Nov. 5, 1929.  A. I. VAN LEER  1,734,839
BRAKE APPARATUS FOR VEHICLES
Filed July 27, 1925   2 Sheets-Sheet 1
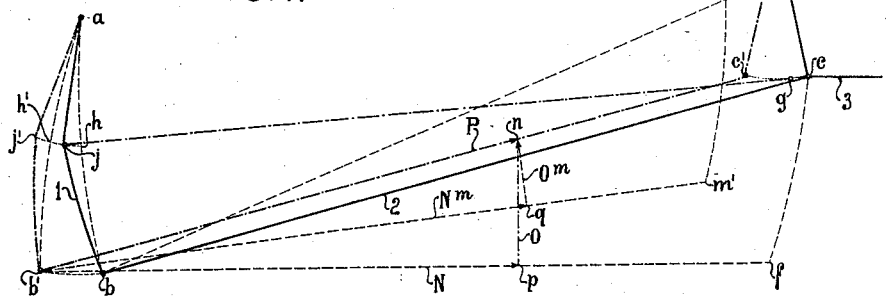
FIG.1.
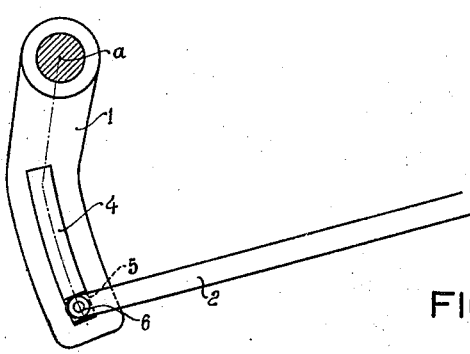
FIG.2.
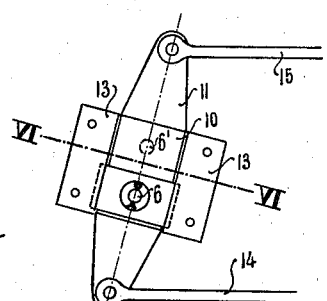
FIG.5.
FIG.6.
FIG.3.
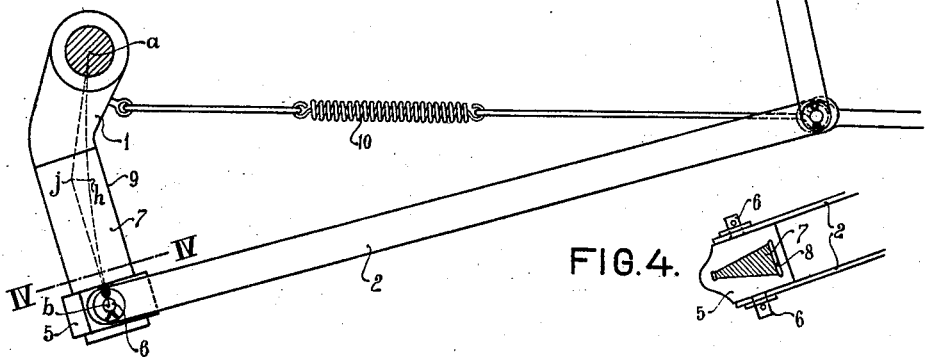
FIG.4.
INVENTOR
A. I. VanLeer
by Langner, Parry, Card & Langner
Attys.

Nov. 5, 1929.  A. I. VAN LEER  1,734,839
BRAKE APPARATUS FOR VEHICLES
Filed July 27, 1925    2 Sheets-Sheet 2
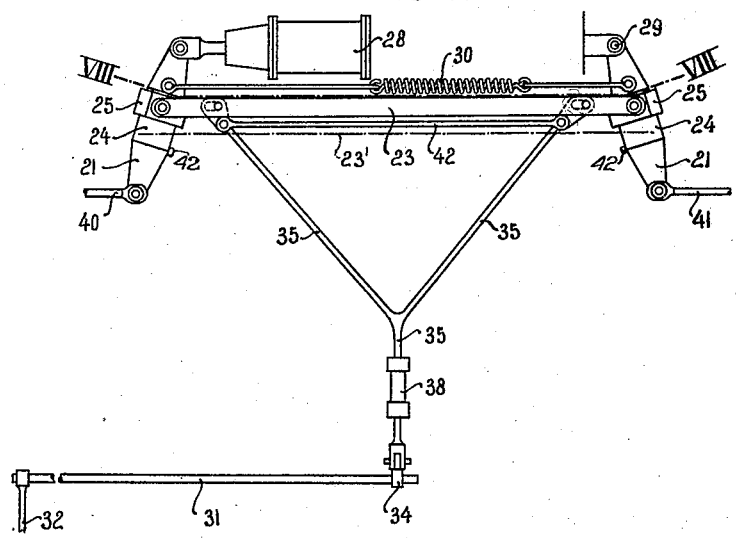
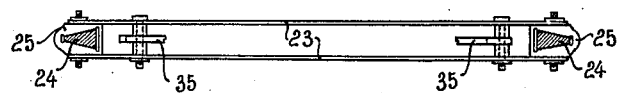
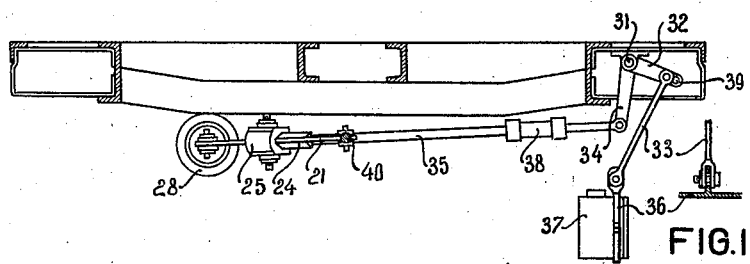
INVENTOR
A.I. VanLeer
by Lanjuin, Parry, Card thaujuin
Att'ys Patented Nov. 5, 1929

1,734,839

UNITED STATES PATENT OFFICE

ALEXANDER IZAÄK VAN LEER, OF THE HAGUE, NETHERLANDS

BRAKE APPARATUS FOR VEHICLES

Application filed July 27, 1925, Serial No. 46,408, and in the Netherlands August 5, 1924.

This invention relates to brake apparatus for vehicles, more particularly for railway and tramway vehicles, locomotives and tenders, wherein the brake pressure is regulated by shifting the fulcrum of a lever, or the point of application of a pull or push rod to a lever, in the longitudinal direction of the lever.

In such brake apparatus, during braking, the said fulcrum or the said point of application has a tendency to travel in the longitudinal direction of the lever. If this tendency, which increases as the lever undergoes a greater angular displacement in consequence of the increase in the clearance space between the brake blocks and the tires, becomes so great that travelling occurs, the definite position which the brake apparatus is intended to occupy becomes lost and no longer corresponds to the purpose in view.

This disadvantage is obviated according to the invention by the fact that the guide that guides the fulcrum or the point of application during its displacement is shaped in such a way that the said fulcrum or the said point of application is prevented, purely as a result of the shape of the guide, from travelling in the longitudinal direction of the lever during braking.

For this purpose the guide, or at least that part of it where the point of application of the pull or push rod is located when the vehicle is empty or only partially loaded, may be in the form of an arc of a circle, the centre of which, when the brake is completely released, is located outside the pull or push rod on that side of it where the fulcrum of the lever is located.

The guide and a member which contains the fulcrum or the point of application may also be shaped in such a way that during the braking the guide acts on the said member, or the said member on the guide, like a wedge. In this case the wedge surfaces of the guide and of the said member are preferably kept out of contact with one another, when the brake is released, by means of a spring.

The invention will now be further described in connection with the accompanying drawings which illustrate, by way of example only, some embodiments.

Figure 1 is a diagrammatic side view of a part of an embodiment.

Figure 2 is a side view of a brake lever together with a sliding shoe and a part of a pull rod of said embodiment.

Figure 3 is a side view of a part of a second embodiment.

Figure 4 is a cross section on the line IV—IV of Figure 3.

Figure 5 is a plan of a part of a third embodiment.

Figure 6 is a cross section on the line VI—VI in Figure 5.

Figure 7 is a plan of a part of a fourth embodiment.

Figure 8 is a section on the line VIII—VIII in Figure 7.

Figure 9 is a side elevation of the fourth embodiment.

Figure 10 is a cross section of a detail of the fourth embodiment, while

Figure 11 shows a modified form of a detail of said embodiment.

In the part of the embodiment diagrammatically illustrated in side elevation in Figure 1, a lever 1 is secured to a shaft $a$ rotatably secured to the underframe of the vehicle, the shaft $a$ being influenced by the source of power. A pull rod 2, which is guided at its left hand end along the lever 1 is connected at its right hand end $c$ to a pull rod 3 and in conjunction with the latter, to a suspension link or brake hanger pivotally connected to the underframe at $d$. By means of the pull rod 3 the force exerted by the source of power is transmitted to the brake blocks. The left hand end of the pull rod 2 is located at $b$ when the vehicle is empty and at $j$ when the vehicle is fully loaded. The brake pressure is therefore greater in the case of a loaded vehicle than in the case of an empty vehicle. The part $b$—$j$ of the lever 1 is in the form of a circular arc, the centre $m$ of which is located on a line $b$—$r$.

Figure 2 shows a side view of the lever 1 secured to the shaft $a$. The lever 1 has a slot 4 of the form of an arc of a circle in which slot a sliding shoe 5 can move up and down. To the sliding shoe 5 is pivoted the pull rod 2 by means of a bolt 6.

When the brake is fully released, the lever 1 occupies the positon a—j—b and when the brake is applied occupies the position a—j'—b'. The centre point of the circular arc b'—j' is found by drawing a circular arc m—m' with the point a as centre and determining the point m' thereon, the distance b'—m' of which from the point b' equals b—m.

If the lever 1 were curved along the circle a—h—b with the point c as centre it would occupy the position a—h'—b' when the brake is applied. In order to find the centre point f of the arc a—h'—b' a circular arc c—f is drawn with the point a as centre and upon this arc is found the point f the distance b'—f of which from the point b' equals b—c. The tensile force P (equals b'—n) in the rod 2 would then have a component N (equals b'—p) in the direction of the radius b'—f of the arc a—h'—b' and a component O (equals p—n) tangential to the said arc. Of these the component N counterbalances the torque or moment of rotation exerted by the source of power on the shaft a and the component O, if the latter is greater than the friction produced by the component N, causes the pull rod 2 to travel relatively to the lever 1, which might impair the satisfactory working of the brake apparatus.

Since however the part b—j of the lever 1 has the form of an arc of a circle with the point m as its centre, the components N and O are replaced by the components $N^m$, equal to b'—q, and $O^m$, equal to q—n. These components are not altered by the displacement of the point m along the line b—r. If the point m were displaced to infinity the arc b—j would become a straight line perpendicular to the line b—r and therefore making an obtuse angle with the line b—c.

The component $O^m$, which tends to impair the satisfactory working of the brake, becomes smaller as the line b—r, on which the centre point of the arc lies when the brake is fully released, makes a greater angle with the line b—c. It becomes equal to zero for a position of the line b—r such that the point m' comes to lie on the line b—c. If the angle between the lines b—r and b—c becomes still greater, the component O is directed downwards. In general the centre point m can be selected in such a way that for the maximum clearance space occurring during working between the brake blocks and the tires, that is to say, for the maximum angular displacement of the lever 1, the component $O^m$ is smaller than the friction produced by the component $N^m$.

When the vehicle is fully loaded the sliding shoe 5 abuts against the upper edge of the slot 4 of the lever i in consequence of which the sliding shoe is prevented from creeping upwards. In a partially loaded vehicle the rod 2 can assume such a position that if, during braking, said rod travels upwards the brake pressure is not increased to such an extent that the wheels are locked. Hence, it follows that it may be sufficient that only the part of the slot 4 where the sliding shoe 5 is located in the case of an empty or partially loaded vehicle is shaped in such a way that the rod 2 is prevented from travelling upwards during braking.

If the point m is chosen in such a way that the point j coincides with the point h, the right-hand end of the pull rod 2, in the case of a loaded vehicle, is at the point c, where it is also located in the case of an empty vehicle. In Figure 1 however the point m is so chosen, that in the event of the displacement of the left-hand end of the pull rod 2 from b to j the right-hand end of the said rod is shifted from c to g, whereby the brake blocks are moved nearer to the tires. This is in particular a great advantage in the case of compressed-air or vacuum brakes, because otherwise in the loaded vehicle wherein the transmission ratio between the source of power and the brake blocks becomes greater in consequence of the displacement of the pull rod 2, the stroke of the brake piston might be too great if the clearance space between the brake blocks and the tires were not decreased.

In the part of the embodiment illustrated in side elevation in Figure 3, the lever 1 secured to the shaft a has a straight part 7 on which the sliding shoe 5 is guided. The part 7 is wedge-shaped in cross section (see Figure 4, which is a cross-section on the line IV—IV in Figure 3). The sliding shoe 5 is also wedge-shaped in cross-section internally. When the brake is released the surface 9 of the lever 1 is in contact with the inner surface 8 of the sliding shoe 5. When the brake is applied the part 7 of the lever 1 being rotated towards the left, the wedge surfaces of the lever are pressed against the wedge surfaces of the sliding shoe, as shown in Figure 4. No displacement of the sliding shoe in the longitudinal direction of the lever can occur if the vertical angle at the apex of the wedge is suitably selected so long as the wedge surfaces are clamped together, but only when the latter are released from one another or the pressure between them has vanished. Just as in Figure 1, the brake blocks are moved nearer to the wheels when the brake pressure increases in consequence of the displacement of the sliding shoe along the lever 1. In order to prevent the wedge surfaces of the lever and those of the sliding shoe from engaging during this displacement, a tension spring 10 is provided, which exerts upon the pull rod 2 and the sliding shoe 5 a tensile force directed towards the left.

Figure 5 is a plan of a part of an embodiment and

Figure 6 is a cross section on the line VI—VI in Figure 5.

In these Figures a sliding shoe 5 is displaceable on the part 10 of a lever 11, the said part being wedge-shaped in cross section. The sliding shoe 5 is also wedge-shaped in cross section internally. The sliding shoe 5 is rotatable on trunnions 6 in shoes 12 which are guided between guides 13 secured to the underframe of the vehicle. To one end of the lever 11 is pivoted a pull rod 14 which is subject to the action of the source of power. A pull rod 15 pivoted to the other end of the lever 11 transmits the force exerted by the source of power to the brake blocks. The sliding shoe 5, which is shown in the position which it occupies when the vehicle is empty, is located, when the vehicle is loaded, with the trunnion 6 in the position indicated by 6'. In this instance it is not the point of application of a pull rod that is displaced, as in the case of the constructional examples described above, but the fulcrum of the lever 11. Since the guides 13 are parallel to the part 10 of the lever 11 when the brake is fully released, the position of the brake blocks is not altered by displacing the sliding shoe 5 over the part 10. The guides 13 may, however, be arranged at an angle to the lever 11 in such a way that the clearance space between the brake blocks and the tires, when the vehicle is loaded, is smaller than in the case of an empty vehicle. As in the foregoing embodiment, by means of a spring, care can be taken that when the brake is released the wedge surfaces of the lever and those of the sliding shoe are not in contact with one another.

Figure 7 is a plan of a part of an embodiment in which the brake pressure is altered by shifting a connecting rod arranged between two levers relatively to the said levers.

Figure 8 is a cross section of the same part on the line VIII—VIII in Figure 7,

Figure 9 a side elevation thereof and

Figure 10 a cross section of a detail, while

Figure 11 shows a modified form of a detail.

Two substantially horizontal levers 21, of which the left-hand lever is pivoted to the piston rod of a brake cylinder 28 and the right-hand lever is pivoted at 29 to a fixed point of the underframe of the vehicle, have each a part 24 which is wedge-shaped in cross section and on which a sliding shoe 25 is guided, which is also wedge-shaped in cross section internally. A pull rod 23 is pivoted at its ends to the sliding shoes 25. The forces exerted by the brake piston on the two levers 21 are transmitted by means of pull rods 40 and 41 to the brake blocks. The pull rod 23, which is shown in the position which it occupies when the vehicle is empty, moves when the vehicle is loaded into the position 23' shown in chain-dotted lines. In consequence of this displacement of the pull rod 23 the rods 40 and 41 are pulled and the brake blocks moved nearer to the tires. During the braking the sliding shoes 25 are prevented from sliding along the levers 21 by the jamming action of the wedge surfaces. By means of a tension spring 30 the wedge surfaces of the sliding shoes 25 and of the levers 21 are kept out of contact with one another when the brake is released.

The displacement of the rod 23 along the levers 21 is brought about by means of a shaft 31 arranged in the longitudinal direction of the vehicle, the said shaft being rotatable in bearings secured to the vehicle underframe. The shaft 31 is coupled by means of a crank 32 and coupling rod 33 to a stirrup 36 embracing an axle bearing 37 and is connected by means of a crank 34 and a forked coupling rod 35 with the pull rod 23. The bolts which connect the rod 23 with the two limbs of the forked rod 35 engage the said limbs in elongated holes. In order to produce greater rigidity the two limbs of the forked rod 35 are connected with one another by means of a transverse rod 42. Owing to the deflection of the supporting springs when the vehicle is loaded, the shaft 31 is rotated and the rod 23 shifted along the levers 21. In this instance therefore the points of application of a pull rod and also the fulcrums of two levers are displaced. In the rod 35 is arranged a dash pot 38 which takes up the deflection of the supporting springs if the vehicle is loaded or unloaded with the brake applied. In order to make the rod 23 as independent as possible of the play of the supporting springs of the vehicle the connecting bolt of the rod 33 and the stirrup 36 has clearance upwards and downwards in the stirrup as shown in Figure 10. Owing to this clearance the said bolt contacts, after loading and unloading of the vehicle, at first with the lower and upper edge respectively of the elongated hole in the stirrup, but comes into the central position when the vehicle is running.

When the supporting springs have taken a permanent set the rod 33 is coupled at 39 to the crank 32 as a result of which, at increased deflection of the supporting springs, the displacement of the rod 23 can be kept approximately constant. If desired each of the levers 21 may be provided with a stop 42 to limit the displacement of the rod 23, which stop may be threaded into said lever.

Since the right hand lever 21, which is pivoted to the stationary point 29, undergoes a smaller angular displacement than the left hand lever 21 which is pivoted to the brake piston rod and therefore during the braking the angle between the right hand lever 21 and the rod 23 differs less from a right angle than the angle between the left hand lever 21 and the rod 23, it is possible that in particular cases the friction between a right hand lever rectangular in cross section, and a sliding shoe, internally rectangular in cross section (Figure 11), may be sufficient to prevent the right hand and end of the rod 23 from travelling relatively to the right hand lever 21 during braking. In consideration of this the right hand lever 21 may be so arranged that when the brake is released it makes an angle with the pull rod 23 differing less from a right angle.

The invention is obviously susceptible of various other modifications or variations. It is also to be understood that the invention is not limited to apparatus in which the vertical movement of the vehicle on its supporting springs due to a change in the weight of the load is employed to change the brake lever ratio.

What I claim is:—

1. In a brake apparatus for vehicles, particularly of that type which vary the brake pressure according to the load on the wheels of the vehicle by changing the brake lever ratio, a lever having a guideway, and a fulcrum adapted to move along said guideway so as to change the brake lever ratio, said guideway and fulcrum being so shaped as to engender, under braking pressure, a frictional value between them, sufficient to prevent shifting of said fulcrum relative to said guideway.

2. In a brake apparatus for vehicles, particularly of that type which vary the brake pressure according to the load on the wheels of the vehicle by changing the brake lever ratio, a lever having a guideway, a member adapted to move along said guideway so as to change the brake lever ratio, and a trunnion associated with said member and serving as a fulcrum of said lever, the said guideway and the said member being provided with wedge faces adapted to engage each other.

3. In a brake apparatus for vehicles, particularly of that type which vary the brake pressure according to the load on the wheels of the vehicle by changing the brake lever ratio, a lever having a guideway, a member adapted to move along said guideway so as to change the brake lever ratio, a trunnion associated with said member and serving as a fulcrum of said lever, and a spring, the said guideway and the said member being provided with wedge faces adapted to engage each other, and the said spring tending to keep the wedge faces disengaged.

In testimony whereof I affix my signature.

ALEXANDER IZAÄK VAN LEER.